United States Patent
Hada et al.

(10) Patent No.: US 10,114,359 B2
(45) Date of Patent: Oct. 30, 2018

(54) NUMERICAL CONTROL DEVICE FOR REALIZING HIGH-SPEED INPUT AND OUTPUT OF EXTERNAL SIGNAL IN SERVO CONTROLLER

(71) Applicant: FANUC CORPORATION, Yamanashi (JP)

(72) Inventors: Kouji Hada, Yamanashi (JP); Yoshito Miyazaki, Yamanashi (JP); Takaaki Komatsu, Yamanashi (JP); Yasumichi Sakoda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/355,255

(22) Filed: Nov. 18, 2016

(65) Prior Publication Data
US 2017/0146973 A1    May 25, 2017

(30) Foreign Application Priority Data
Nov. 19, 2015  (JP) .................... 2015-226632

(51) Int. Cl.
| G06F 19/00 | (2018.01) |
| G05B 19/19 | (2006.01) |
| G05B 19/414 | (2006.01) |

(52) U.S. Cl.
CPC ......... *G05B 19/19* (2013.01); *G05B 19/4147* (2013.01); *G05B 2219/50047* (2013.01)

(58) Field of Classification Search
CPC combination set(s) only.
See application file for complete search history.

(56) References Cited

U.S. PATENT DOCUMENTS

| 5,196,687 A * | 3/1993 | Sugino ................. G06K 7/0021 |
|  |  | 235/441 |
| 5,850,338 A | 12/1998 | Fujishima |
| 5,940,292 A * | 8/1999 | Kurakake .......... G05B 19/4142 |
|  |  | 700/56 |
| 6,147,469 A * | 11/2000 | Uchida ................ G05B 19/414 |
|  |  | 318/16 |

(Continued)

FOREIGN PATENT DOCUMENTS

| EP | 0942343 A2 * | 3/1998 |
| JP | H09-073310 A | 3/1997 |

(Continued)

*Primary Examiner* — Kidest Bahta
(74) *Attorney, Agent, or Firm* — Hauptman Ham, LLP

(57) ABSTRACT

A numerical control device includes a CPU for outputting a position command value of a servomotor; an IC including a servo controller for outputting a current command value to an amplifier for driving the servomotor, and an I/O unit for inputting and outputting an external signal; a DSP for reading the position command value and performing control so as to move the servomotor to a position indicated by the position command value; and an inter-device communication path between the CPU and the IC. The IC includes an internal bus connected to a communication interface connected to the inter-device communication path, and the I/O unit; and an internal communication path for directly transmitting a signal between the servo controller and the I/O unit without passing through the internal bus.

6 Claims, 4 Drawing Sheets

(56) References Cited

U.S. PATENT DOCUMENTS

| | | | |
|---|---|---|---|
| 6,430,634 B1* | 8/2002 | Mito | G05B 19/042 |
| | | | 710/100 |
| 6,625,498 B1* | 9/2003 | Kurakake | G05B 19/0421 |
| | | | 700/19 |
| 2005/0004707 A1* | 1/2005 | Kazi | B25J 9/1682 |
| | | | 700/245 |
| 2006/0100723 A1* | 5/2006 | Sun | G05B 19/4141 |
| | | | 700/61 |
| 2008/0238351 A1 | 10/2008 | Aoyama et al. | |
| 2015/0077031 A1 | 3/2015 | Sugitani et al. | |

FOREIGN PATENT DOCUMENTS

| | | |
|---|---|---|
| JP | 9-146616 A | 6/1997 |
| JP | 9-160613 A | 6/1997 |
| JP | H09146623 A | 6/1997 |
| JP | H10240330 A | 9/1998 |
| JP | 2834122 A | 12/1998 |
| JP | 2002108442 | 4/2002 |
| JP | 2003-316408 A | 11/2003 |
| JP | 2008242728 A | 10/2008 |
| JP | 2011-123667 A | 6/2011 |
| JP | 2013-054730 A | 3/2013 |
| JP | 2014-211721 A | 11/2014 |
| JP | 2015060370 A | 3/2015 |

\* cited by examiner

NUMERICAL CONTROL DEVICE FOR REALIZING HIGH-SPEED INPUT AND OUTPUT OF EXTERNAL SIGNAL IN SERVO CONTROLLER

RELATED APPLICATIONS

The present application claims priority to Japanese Application Number 2015-226632, filed Nov. 19, 2015, the disclosure of which is hereby incorporated by reference herein in its entirety.

BACKGROUND OF THE INVENTION

1. Field of the Invention

The present invention relates to a numerical control device used in motor control, robot control, and the like, and specifically relates to a numerical control device that realizes high-speed input and output of external signals in a servo controller.

2. Description of Related Art

Numerical control devices are used in computer numerical control (CNC) for controlling machine tools. Robot controllers, which control a motor in a robot, have a configuration similar to the numerical control devices for the CNC. A numerical control device according to the present invention is not limited to a numerical control device for the CNC, but includes a robot controller.

To manufacture the numerical control devices, a main controller for overall control, a programmable logic controller (PLC) having a sequence function to control input and output of signals to and from a machine, a servo controller to input and output signals to and from a servomotor through a servo interface (hereinafter sometimes abbreviated by I/F), and an arithmetic unit (DSP) for performing arithmetic processing on a servo control signal are connected to the other components of the device at data input-output (I/O) interfaces, user interfaces, peripheral device interfaces, and the like through a parallel data bus (hereinafter sometimes abbreviated by bus), to establish communications among the components.

The numerical control devices must have a configuration that sufficiently meets required specifications and takes cost into consideration. At this time, it is desirable to consider improvement in the performance of the components to be used, a change in a delivery system of the components, and the like. To manufacture the numerical control devices, a general-purpose processor (CPU) and DSP are commonly used to form the main controller and the PLC. On the other hand, reducing the number of the components is effective at reducing the costs, and therefore the components other than the CPU and the DSP, i.e., the servo controller and the other circuits are integrated into a single integrated circuit (IC). Such an IC is referred to as an application specific integrated circuit (ASIC). When the components other than the CPU and the DSP are integrated into the ASIC in the above configuration having the bus, the CPU, the DSP, and the ASIC are connected to the bus, and the bus is included in the ASIC.

Furthermore, multicore CPUs and serial interfaces have been developed. The main controller and the PLC can be easily configured in one multicore CPU. In the configuration having the CPU and the ASIC, when a high speed serial interface such as PCI Express™ or the like substitutes for the bus, communications are performed through the serial interface between the CPU and the ASIC, while communications are performed through the bus in the ASIC.

It is important for communications in the numerical control device to secure communication performance between the main controller (in the CPU) and the servo controller (in the ASIC). The communication performance exerts an influence on the performance of an object to be controlled such as a machine or a robot.

As techniques associated with an increase in the speed and performance of the numerical control devices, the following proposals are described (for example, Japanese Unexamined Patent Publications (Kokai) No. 2013-054730 (hereinafter referred to as "patent document 1"), No. 2003-316408 (hereinafter referred to as "patent document 2"), No. 2014-211721 (hereinafter referred to as "patent document 3"), and No. 09-073310 (hereinafter referred to as "patent document 4")). The patent document 1 discloses a configuration in which a motor control processor in a motor controller is constituted of a multicore DSP, and connected to a motor control amplifier through a high-speed serial interface (refer to paragraphs [0016] to [0018] and FIG. 1). The multicore CPU has the functions of numerical control, motor control, and the PLC, and connected to a bus bridge, which also has the function of communication control, through a high speed serial communication interface.

The patent document 2 discloses a configuration in which a high-speed CPU, which is driven by an operating system having a low data processing capacity and a high processing speed, processes low volume data that has a direct effect on the processing speed, I/O among components of a machine tool, and the like. Another low-speed CPU, which is driven by an operating system having a high data processing capacity and a low processing speed, processes high volume data that has no direct effect on the processing speed, while sharing data with the high-speed CPU. Such a configuration allows controlling the machine tool at a high speed with high performance (for example, refer to paragraph [0017] and FIG. 3). Also, the relationship between a data processing capacity and a processing time, relative to the contents of processed data, is described (for example, refer to paragraph [0016] and FIG. 2). The patent document 2 also discloses that the high-speed CPU reads and processes data stored in an information sharing unit at a high speed, and generates a control signal from the processed data to control a servomotor (refer to paragraph [0026]).

The patent document 3 discloses a numerical control device having a numerical controller and a robot controller. Numerical control and robot control, which are conventionally performed by different processors, are integrated into a multicore processor.

The patent document 4 discloses a numerical control device that uses a network for connecting controllers, in order to reduce complication of cable connection.

Furthermore, in the numerical control devices, an external input signal of external input and output (I/O) signals is transmitted to the main controller and subjected to some sort of process. For example, an input signal associated with servo control is processed by the main controller, and then a control signal according to a processing result is transmitted to the servo controller. When the CPU having the main controller and the ASIC having the servo controller are connected through the high-speed serial interface, as described above, a signal is transmitted from the main controller to the servo controller through the high-speed serial interface and a bus included in the ASIC. Also, the ASIC is provided with an input and output unit for the I/O signals, and an input signal that is not required to be processed by the main controller is transmitted from the input and output unit to the servo controller through the bus in the ASIC. Since the servo controller is connected to the internal bus of the ASIC, input signals of the servo controller are anyway transmitted through the bus. The input signals of the servo controller includes emergency signals, such as an emergency stop signal for an operating motor from the outside and a change command signal to a predetermined rotation state of the motor. Besides, some of the input signals, such as a signal that notifies a processing machine of the completion of a certain operation, require high responsivity of the servo controller to the signals. In punching process by punch press sheet-metal processing machines, it is desirable that the processing machines immediately shift to the next step upon detecting a sheet-metal punching completion signal, in order to shorten cycle time. Also, in sheet-metal bending process using press brakes, it is desirable that the processing machines immediately shift to the next step upon detecting a completion signal indicating that a bending angle of sheet metal has reached a predetermined angle, in order to shorten cycle time. Also, it is desirable that cylinder grinders immediately shift to the next step as soon as workpieces have reached a predetermined diameter or surface roughness during processing, in order to shorten cycle time. As described above, the input signals of the servo controller have a delay because of being transmitted through the bus. Especially, there is a problem that, even if communications of the input signals have higher priority, when high volume data is being transferred through the bus, the delay is increased due to time required for the data to be evacuated from the bus.

SUMMARY OF THE INVENTION

An object of the present invention is to reduce communication time of emergency input signals and input signals requiring high responsivity from an input and output unit to a servo controller, in a numerical control device having an IC including the servo controller and the input and output unit for external signals.

A numerical control device according to the present invention includes a CPU for outputting a position command value of a servomotor; an integrated circuit including a servo controller for outputting a current command value to an amplifier for driving the servomotor, and an I/O unit for inputting and outputting an external signal; a DSP for reading the position command value and performing control so as to move the servomotor to a position indicated by the position command value; and an inter-device communication path between the CPU and the integrated circuit. The integrated circuit includes an internal bus connected to a communication interface connected to the inter-device communication path, and the I/O unit; and an internal communication path for directly transmitting a signal between the servo controller and the I/O unit without passing through the internal bus.

BRIEF DESCRIPTION OF THE DRAWINGS

The objects, features, and advantages of the present invention will be more apparent from the following description of embodiments in conjunction with the attached drawings, wherein.

DETAILED DESCRIPTION OF THE INVENTION

A numerical control device according to the present invention will be described below with reference to the drawings.

First Embodiment

Figure 1:
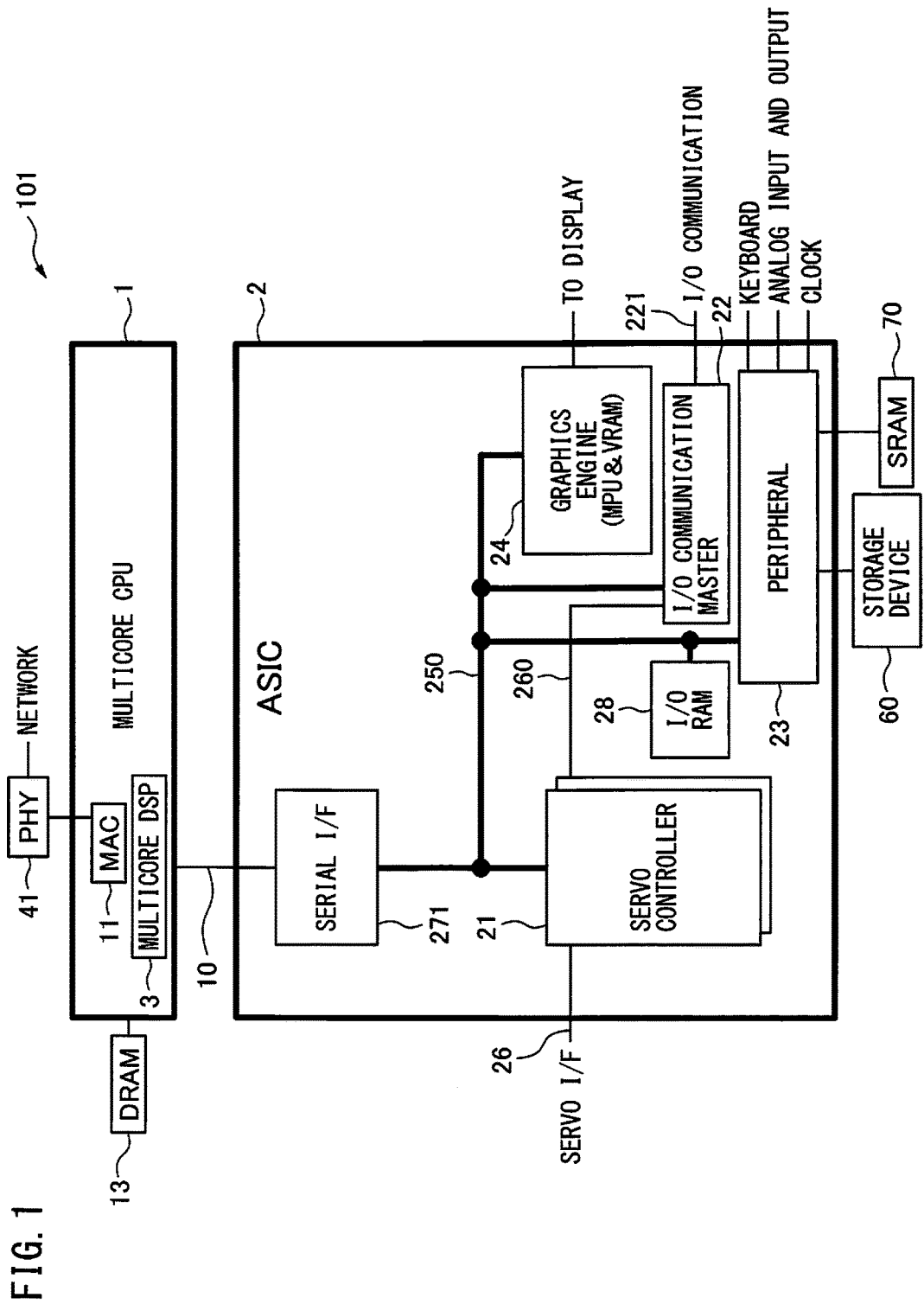
FIG. 1 is a block diagram of a numerical control device according to a first embodiment of the present invention.

A numerical control device according to a first embodiment of the present invention will be described. FIG. 1 is a block diagram of the numerical control device according to the first embodiment of the present invention. A numerical control device 101 according to the first embodiment of the present invention has a multicore CPU 1 and an ASIC 2. The multicore CPU 1 and the ASIC 2 are connected through a high-speed serial interface line 10. The high-speed serial interface line 10 may be, for example, a PCI Express™ bus, but is not limited thereto.

The multicore CPU 1 includes a multicore DSP 3 and a media access controller (MAC) 11. The multicore DSP 3 performs an operation associated with servo control. The media access controller 11 establishes communications with a network through a physical layer (PHY) 14. The network is, for example, a multi-function Ethernet™. The "multi-function" Ethernet refers to Ethernet™ that is usable in various industries. However, the network is not limited to this. In this embodiment, as shown in FIG. 1, a DRAM 13, which functions as a main memory for the CPU, is externally connected to the multicore CPU 1, but may be externally connected to the ASIC 2.

The ASIC 2 includes a servo controller 21, an I/O communication master 22, a peripheral 23, a graphics engine (MPU and VRAM) 24, an I/O RAM 28, a serial interface (I/F) 271, and an ASIC internal bus 250. The servo controller 21, the I/O communication master 22, the peripheral 23, the graphics engine (MPU and VRAM) 24, the I/O RAM 28, and the serial interface 271 are connected to the first ASIC internal bus 250.

The I/O communication master 22 is a circuit for controlling I/O communications. To the I/O communication master 22, a slave unit (not shown) is connected to input and output DI/DO through an external interface terminal 221 for the I/O communications. The I/O communication master 22 outputs the DO stored in the I/O RAM 28 to the slave unit. On the other hand, the DI inputted from the slave unit is stored as the DI in the I/O RAM 28 through the I/O communication master 22. An internal communication path 260 is provided between the I/O communication master 22 and the servo controller 21. The DI/DO is read from the I/O RAM 28 and written to the I/O RAM 28 through the high-speed serial interface line 10, the serial interface 271, and the ASIC internal bus 250 according to a sequence program run on the multicore CPU 1. Instead of providing the I/O RAM 28, the DRAM 13 may be used as a memory for storing I/O data inputted and outputted by the I/O communication master 22. Alternatively, another RAM may be connected to the ASIC 2, and used as the I/O RAM 28 and a working memory of the ASIC 2.

To the peripheral 23, a storage device 60 and an SRAM 70 backed up with a battery are connected. The storage device 60 stores CNC software, which is loaded into the DRAM 13 at the time of initialization of the multicore CPU 1. The SRAM 70 is used for storing data during operation, so that the device is recoverable to its original state even if power is turned off. Furthermore, the peripheral 23 has external interface terminals for a keyboard, analog input and output, and a clock. Using these terminals, user's input, signal input to skip a processing program during execution, signal input from a touch sensor, clock input, analog spindle output (analog output), and the like are performed.

The graphics engine 24 is constituted of a processor (MPU) for realizing simple graphics functions, a VRAM for storing screen image data, and a controller for outputting the data written to the VRAM to a display such as an LCD panel.

Next, servo control will be described. The multicore CPU 1 writes a move command value to the DRAM 13 or a cache in the CPU, and the DSP core 3 accesses the move command value. The DSP core 3 generates a current command value for an amplifier from the move command value to move a servomotor to a position indicated by the move command value, and transmits the current command value to the servo controller 21 through the high-speed serial interface line 10, the serial interface 271, and the ASIC internal bus 250.

The servo controller 21 is provided with a servo interface (I/F) 26. The servo interface 26 is an interface to connect a servo amplifier or a spindle amplifier to the servo controller 21. To the servo amplifier or the spindle amplifier, a power line of the servomotor or a spindle motor, which operates each axis of a machine tool, and a feedback input signal line to detect the position and speed of each motor are connected.

The servo controller 21 transmits the current command value to the amplifier through the servo interface 26. The amplifier controls a current using a PWM signal based on the received current command value, and transmits the value of a current sensor contained in the amplifier to the servo controller 21 through the servo interface 26. A feedback signal from the servomotor is also transmitted to the servo controller 21 through the servo interface 26. The multicore DSP 3 reads the value of the current sensor and the value of the feedback signal received by the servo controller 21 through the high-speed serial interface line 10, the serial interface 271, and the ASIC internal bus 250. The multicore DSP 3 calculates the next current control command value based on the values, and transmits the next current control command value to the servo controller 21 through the opposite route. The servo controller 21 transmits the next current control command value to the amplifier through the servo interface 26. The multicore DSP 3 controls the servomotor by the repetition of this current control, so as to make each axis reach the position indicated by the multicore CPU 1. The multicore DSP 3 writes the value of the feedback signal to the DRAM 13 or the internal cache. The multicore CPU 1 reads this value, and determines that the axis has reached the position indicated by the position command value.

I/O signal data (DI/DO) inputted and outputted through the I/O communication master 22 is distinguished into a first type of data that can be directly inputted to the servo controller 21 without passing through the multicore CPU 1 and a second type of data including the other.

A first example of the first type of data is a DI signal that makes the servo controller 21 immediately stop the rotation of a specific axis (one or a plurality of axes) designated by the type of the signal, without the mediation of the multicore CPU 1, when the DI signal is inputted from the I/O communication master 22 to the servo controller 21 in a state of rotating the specific axis (one or a plurality of axes).

A second example of the first type of data is a DI signal that makes the servo controller 21 change the rotation speed of a specific axis (one or a plurality of axes) rotating at a constant speed to a value designated by the type of the signal, without the mediation of the multicore CPU 1, when the DI signal is inputted from the I/O communication master 22 to the servo controller 21 in a state of rotating the specific axis (one or a plurality of axes) at the constant speed. The relationship between the type of DI signal and a rotation speed is predetermined in the servo controller 21 before starting operation.

A third example of the first type of data is a DI signal that makes the servo controller 21 move a stopped axis (one or a plurality of axes) to a specific position at a maximum speed achieved with a specific maximum acceleration or deceleration and position the axis therein, without the mediation of the multicore CPU 1, when the DI signal is inputted from the I/O communication master 22 to the servo controller 21 in a state of stopping the specific axis (one or a plurality of axes). The position, the maximum acceleration and deceleration, and the maximum speed are set in advance in the servo controller 21 before starting operation. A plurality of positions and a plurality of maximum speeds, corresponding to a plurality of DI signals, may be set.

A first example of the second type of data is a DI signal that designates a processing program stored in the storage device 60 or the like in advance. Such a DI signal is transmitted from the I/O communication master 22 to the multicore CPU 1. The multicore CPU 1 generates a move command value for the servo controller 21 using the designated processing program, and transmits the move command value to the servo controller 21.

A second example of the second type of data is data in the case of simultaneously performing contouring control (interpolation process) of a plurality of axes. In this case, a slave unit (servo control IC) for controlling another axis is connected to an I/O communication interface of the I/O communication master 22, and the I/O communication master 22 receives data from the slave unit. Such data is required to be processed integrally with data from the servo controller 21 in the main controller of the multicore CPU 1.

The distinction between the first type of data and the second type of data is made using a distinction table provided in the I/O communication master 22. In this table, signals to be treated as the first type of data are designated by an address and a bit of the I/O RAM in which the signals are to be stored, and the first and second types of signals are distinguished based on the table. Instead of the address and the bit, the type of the slave unit connected to the I/O communication interface and a connector terminal provided in the unit may be used. The designation in the distinction table is arbitrarily changeable by a user of the numerical control device.

In the first embodiment, the I/O communication master 22 identifies whether or not DI is the first type of data. When the DI is the first type of data, the DI is transmitted to the servo controller 21 through the internal communication path 260. When the DI is the second type of data, the DI is transmitted to the multicore CPU 1 through the ASIC internal bus 250, the serial interface 271, and the high-speed serial interface line 10. Note that, there is some of the first type of data that should be managed in the multicore CPU 1 for overall control. Such first type of data is transmitted to the servo controller 21 through the internal communication path 260, and thereafter may be appropriately transmitted to the multicore CPU 1 through the ASIC internal bus 250, the serial interface 271, and the high-speed serial interface line 10.

The first embodiment enables a reduction in time between the reception of the first type of data by the I/O communication master 22 and the reception of the first type of data by the servo controller 21. Thus, this embodiment is specifically advantageous when the first type of data requires urgency or high responsivity.

Second Embodiment

Figure 2:
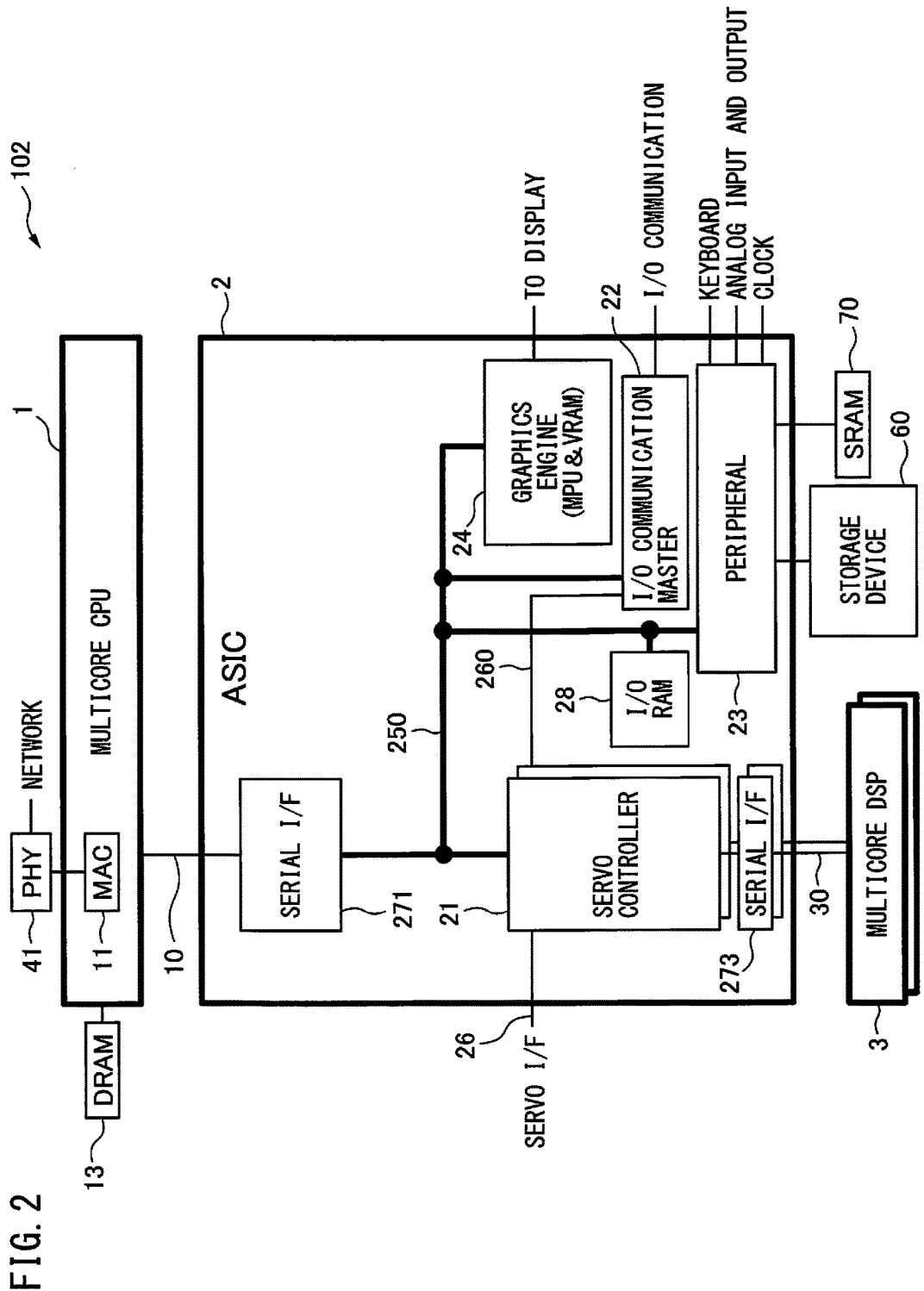
FIG. 2 is a block diagram of a numerical control device according to a second embodiment of the present invention.

Next, a numerical control device according to a second embodiment of the present invention will be described. FIG. 2 is a block diagram of the numerical control device according to the second embodiment of the present invention. The difference between a numerical control device 102 according to the second embodiment of the present invention and the numerical control device 101 according to the first embodiment is that the multicore CPU 1 does not contain the multicore DSP 3, and the multicore DSP 3 is externally connected to the ASIC 2. The other configurations of the numerical control device 102 according to the second embodiment are the same as those of the numerical control device 101 according to the first embodiment, so a detailed description will be omitted.

The ASIC 2 further includes a serial interface (I/F) 273. The servo controller 21 is connected to the multicore DSP 3 through the serial interface 273 and a high-speed serial interface line 30. The high-speed serial interface line 30 may be, for example, a PCI Express™ bus, but is not limited thereto.

Next, servo control will be described. The multicore CPU 1 outputs a position command value for the servomotor (not shown) to the servo controller 21 provided in the ASIC 2. The servo controller 21 outputs a current command value to the amplifier (not shown) for driving the servomotor. The multicore DSP 3 reads the position command value and performs control so as to move the servomotor to a position indicated by the position command value.

The servo controller 21 is provided with the servo interface 26. The servo interface 26 is an interface to connect the servo amplifier or the spindle amplifier to the servo controller 21. To the servo amplifier or the spindle amplifier, the power line of the servomotor or the spindle motor, which operates each axis of the machine tool, and the feedback input signal line to detect the position and speed of each motor are connected.

The position command value is written from the multicore CPU 1 to an internal RAM area of the servo controller 21. The multicore DSP 3 reads the position command value, and performs control so as to move the servomotor to the position indicated by the position command value. The servomotor is controlled through the servo interface 26 connected to the servo controller 21. The multicore DSP 3 writes the value of the feedback signal to the servo controller 21. The multicore CPU 1 reads the value of the feedback signal, and determines that the axis has reached the position indicated by the position command value. The other operations are the same as those of the first embodiment, so the description thereof will be omitted.

Just as the first embodiment, the second embodiment enables a reduction in time between the reception of the first type of data by the I/O communication master 22 and the reception of the first type of data by the servo controller 21.

Third Embodiment

Figure 3:
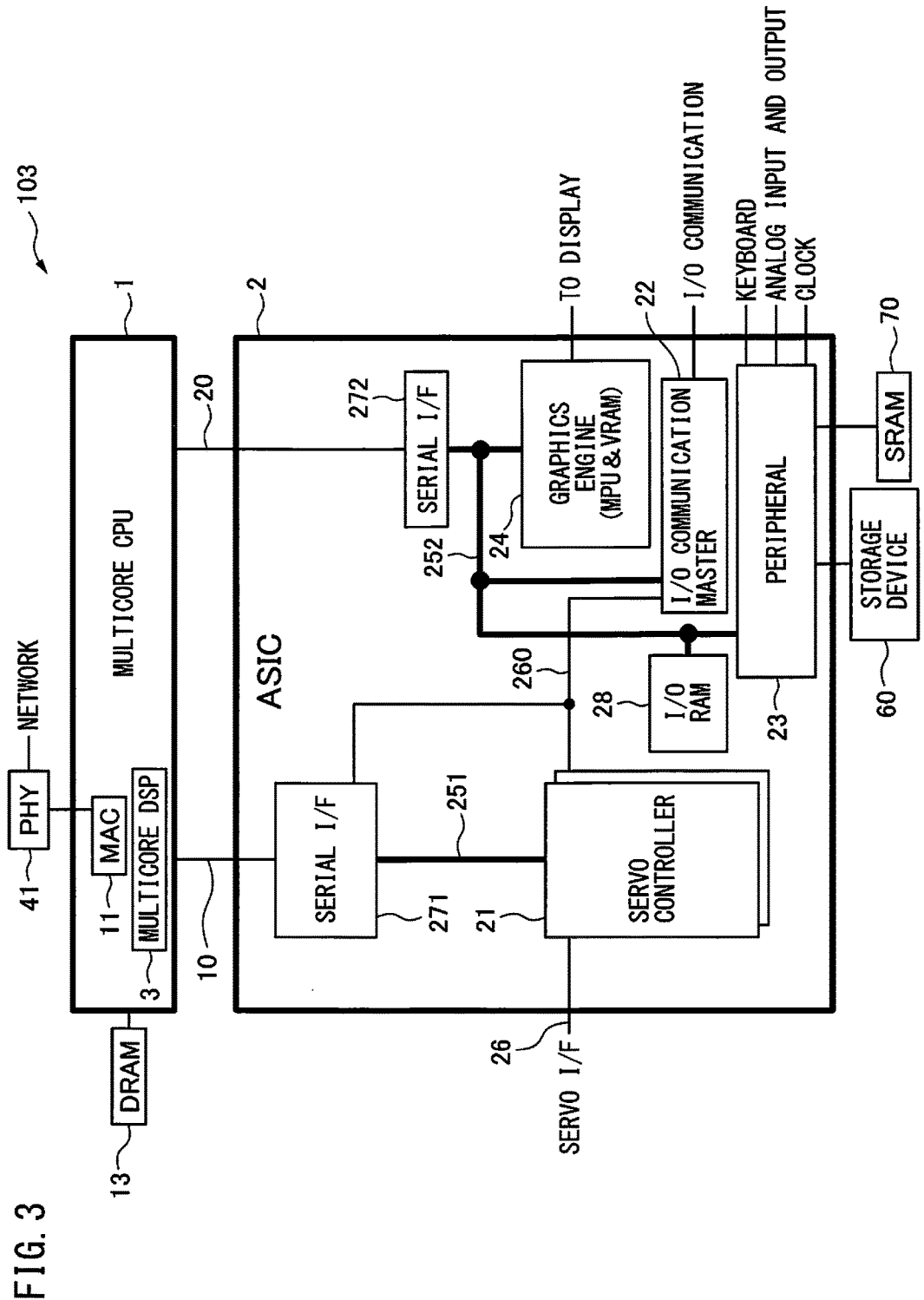
FIG. 3 is a block diagram of a numerical control device according to a third embodiment of the present invention.

Next, a numerical control device according to a third embodiment of the present invention will be described. FIG. 3 is a block diagram of the numerical control device according to the third embodiment of the present invention. The difference between a numerical control device 103 according to the third embodiment of the present invention and the numerical control device 101 according to the first embodiment is that the ASIC internal bus is divided into a first ASIC internal bus 251 to which the servo controller 21 and the serial interface 271 are connected and a second ASIC internal bus 252 to which the other components including the I/O communication master 22, the peripheral 23, the graphics engine 24, and the I/O RAM 28 are connected, a serial interface (I/F) 272 is newly provided to connect the second internal bus 252 to the multicore CPU 1, and a high-speed serial interface line 20 is provided to connect between the multicore CPU 1 and the serial interface 272. The other configurations of the numerical control device 103 according to the third embodiment are the same as those of the numerical control device 101 according to the first embodiment, so a detailed description will be omitted.

Communications of servo control data between the multicore CPU 1 and the servo controller 21 are performed through the high-speed serial interface line 10, the serial interface 271, and the first ASIC internal bus 251. Communications between each component other than the servo controller 21 in the ASIC 2 and the multicore CPU 1 are performed through the high-speed serial interface line 20, the serial interface 272, and the second ASIC internal bus 252.

In the third embodiment, just as the first and second embodiments, it is possible to reduce communication delays of external signals that are urgently required by the servo controller 21 and inputted to the I/O communication master 22. Assuming that the internal communication path 260 is not provided in the numerical control device 103 according to the third embodiment, when the external signals inputted to the I/O communication master 22 are transmitted to the servo controller 21, the external signals are transmitted through the second ASIC internal bus 252, the serial interface 272, the high-speed serial interface line 20, the multicore CPU 1, the high-speed serial interface line 10, the serial interface 271, and the first ASIC internal bus 251, and hence have long delay times, thus being especially effective.

Furthermore, in the third embodiment, since communications between the servo controller 21 and the multicore CPU 1 are not affected by communications between each of the other components in the ASIC 2 and the multicore CPU 1, communication performance between the multicore CPU 1 and the servo controller 21 can be improved. Also, since communications between each of the other components in the ASIC 2 and the multicore CPU 1 are performed independently of the communications by the servo controller 21, communication performance between each of the other components in the ASIC 2 and the multicore CPU 1 can be improved. Therefore, it is possible to improve, for example, rendering functions of the graphics engine 24.

Fourth Embodiment

Figure 4:
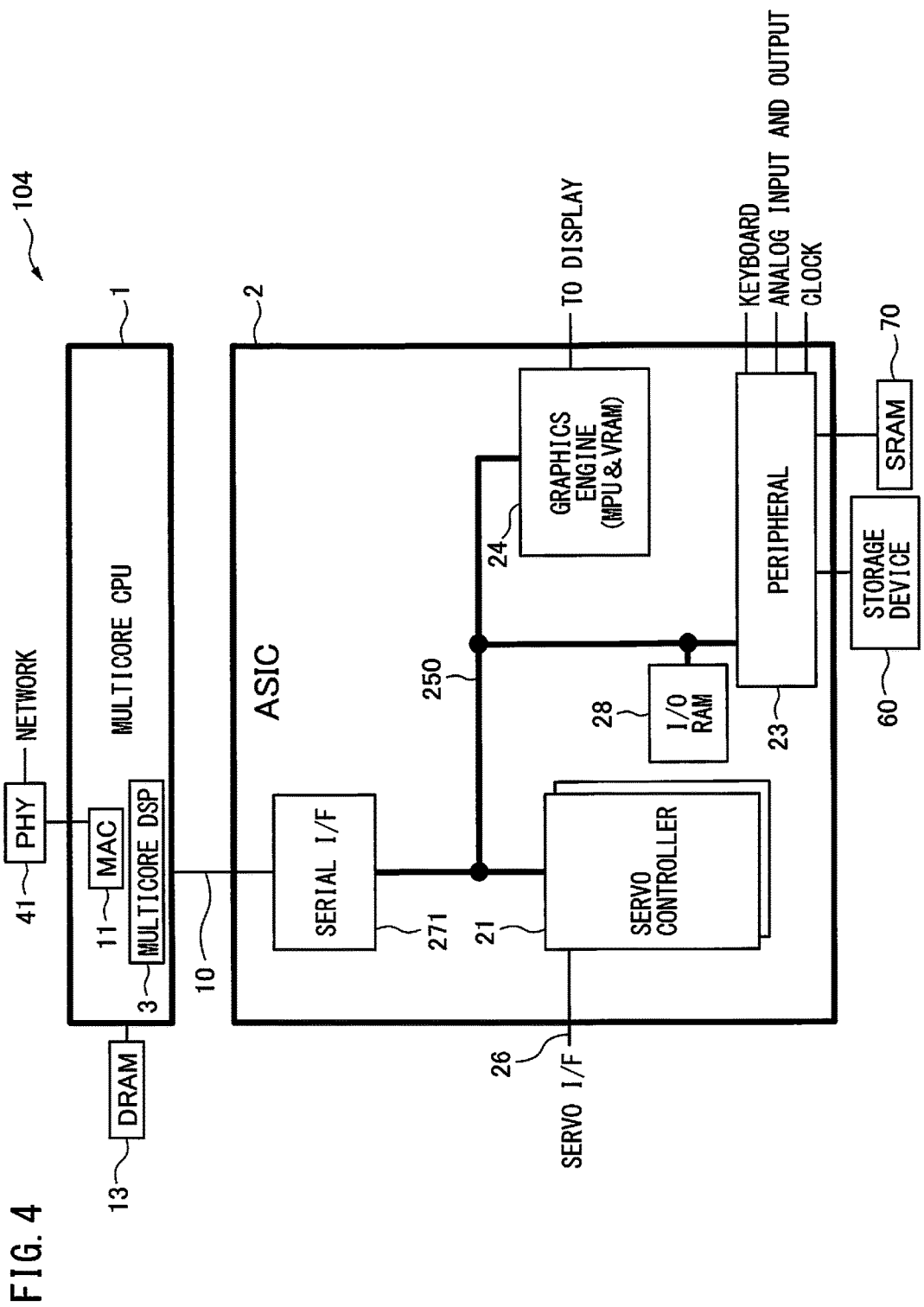
FIG. 4 is a block diagram of a numerical control device according to a fourth embodiment of the present invention.

Next, a numerical control device according to a fourth embodiment of the present invention will be described. FIG. 4 is a block diagram of the numerical control device according to the fourth embodiment of the present invention. The difference between a numerical control device 104 according to the fourth embodiment of the present invention and the numerical control device 101 according to the first embodiment is that the I/O communication master 22 is removed from the ASIC 2, and the I/O signal data (DI/DO), which is inputted and outputted by the I/O communication master 22 in the above embodiments, is inputted from the network to the MAC 11 of the multicore CPU 1, or outputted from the MAC 11 of the multicore CPU 1 to the network. The other configurations of the numerical control device 104 according to the fourth embodiment are the same as those of the numerical control device 101 according to the first embodiment, so a detailed description will be omitted.

The data inputted and outputted through the MAC 11 is stored in the I/O RAM 28, just in the case of the first embodiment.

The embodiments of the present invention are described above, but as a matter of course, may include various modification examples. For example, the communication interface between the multicore CPU 1 and the ASIC 2 is not limited to the serial interface. Which functions are integrated into each IC and which function block is connected to each of a plurality of buses in the ASIC should be appropriately determined in accordance with specifications, and various modification examples take place in accordance therewith.

According to the numerical control device of the present invention, input signals to the servo controller, emergency input signals and input signals requiring high responsivity that are not processed in the CPU are directly transmitted from an I/O unit to the servo controller without passing through the bus in the integrated circuit, thus allowing a reduction in communication time, when compared with transmission through the bus.

What is claimed is:

1. A numerical control device, comprising:
   a CPU which outputs a position command value for a servomotor;
   an integrated circuit including
      a servo controller connected to an amplifier driving the servomotor, wherein the servo controller outputs a current command value to the amplifier to drive the servomotor, and
      an I/O unit which inputs and outputs an external signal;
   a DSP which reads the position command value and performs control so as to move the servomotor to a position indicated by the position command value; and
   an inter-device communication path connecting the CPU and the integrated circuit, wherein
   the integrated circuit further includes:
      a communication interface connected to the inter-device communication path;
      an internal bus outside the I/O unit, and connecting the communication interface and the I/O unit; and
      an internal communication path directly connecting the servo controller and the I/O unit to directly transmit a signal between the servo controller and the I/O unit without passing through the internal bus.

2. The numerical control device according to claim 1, wherein the I/O unit
   distinguishes between
      a first type of data to be directly communicated with the servo controller without passing through the CPU, and
      a second type of data to be communicated with the servo controller through the CPU,
   transmits data distinguished to be the first type of data to the servo controller through the internal communication path, and
   transmits data distinguished to be the second type of data to the CPU through the internal bus, the communication interface, and the inter-device communication path.

3. The numerical control device according to claim 1, wherein the servo controller is connected to the internal bus.

4. The numerical control device according to claim 1, wherein the DSP is contained in the CPU.

5. The numerical control device according to claim 1, wherein the inter-device communication path is compatible with a serial communication interface.

6. A numerical control device, comprising:
   a CPU which outputs a position command value for a servomotor;
   an integrated circuit including
      a servo controller connected to an amplifier driving the servomotor, wherein the servo controller outputs a current command value to the amplifier to drive the servomotor, and
      a peripheral interface;
   a DSP which reads the position command value and performs control so as to move the servomotor to a position indicated by the position command value; and
   an inter-device communication path connecting the CPU and the integrated circuit, wherein
   the integrated circuit further includes:
      a communication interface connected to the inter-device communication path; and
      an internal bus connecting the communication interface, the servo controller and the peripheral interface, and
   an external signal to control the servo controller is input through the CPU.

* * * * *